United States Patent [19]

Botros

[11] 3,929,843

[45] Dec. 30, 1975

[54] DIHYDROXYTHIOPHENOXYANTHRAQUI-NONES

[75] Inventor: Raouf Botros, Beech Creek, Pa.

[73] Assignee: American Color & Chemical Corporation, Charlotte, N.C.

[22] Filed: Nov. 26, 1974

[21] Appl. No.: 527,370

[52] U.S. Cl. .................. 260/383; 8/179; 8/180; 260/371; 260/429 J; 260/439 R
[51] Int. Cl.$^2$ .................. C07C 49/74; C09B 1/02
[58] Field of Search ..................... 260/383

[56] References Cited
UNITED STATES PATENTS

| 3,018,154 | 1/1962 | Downey | 260/383 |
| 3,532,723 | 10/1970 | Hederich et al. | 260/383 |

FOREIGN PATENTS OR APPLICATIONS

| 957,144 | 11/1962 | United Kingdom | 260/383 |
| 1,420,064 | 10/1965 | France | 260/383 |

Primary Examiner—Arthur P. Demers
Attorney, Agent, or Firm—Armstrong, Nikaido & Wegner

[57] ABSTRACT

Dihydroxythiophenoxyanthraquinone dyes are made by the reaction of 1-amino-4-bromoanthraquinone-2-sulfonic acid ("bromaminic acid") with an arylthiol in a lower alkanol, followed by the hydrolysis of the resulting product in situ with an alkali metal hydroxide. Synthetic textile fibers, in particular, polyethylene terephthalate fibers, when dyed with the new dyes are colored in strong, bright, bluish pink hues of excellent buildup.

5 Claims, No Drawings

DIHYDROXYTHIOPHENOXYANTHRAQUINONES

BACKGROUND OF THE INVENTION

Aromatic polyester fibers, such as polyethylene terephthalate fibers, do not readily accept the higher molecular weight dyes, which often provide dyeings of superior properties, especially resistance to sublimation. As a result, it is difficult to find dyes of acceptable shade and brightness which, when dyed by conventional methods on for example, polyester terephthalate, are acceptable in all of the physical properties of substantivity, lightfastness and resistance to sublimation.

Monohydroxythiophenoxyanthraquinones have been known since the pioneer work of Paul Naviasky, reported in U.S. Pat. No. 1,062,990. The products of Naviasky's invention were sulfonated and used as wool colors. In more recent work reported in U.S. Pat. No. 3,018,154 of Downey et al., certain of the dyes produced by Naviasky were recognized as colors for polyester textile material.

1,4-Dihydroxy-2-thiophenoxyanthraquinones are reported in British Pat. No. 957,144 as colorants for synthetic fibers, particularly aromatic polyesters. These dyes are said to dye polyester in brilliant scarlet hues.

Anthraquinone dyes containing the 1,2-dihydroxy configuration and also a thiophenoxy group have been heretofore unknown. The recently issued patent to Hederich et al., U.S. Pat. No. 3,532,723, describes and claims 1,2-dihydroxy-4-anilinoanthraquinones. These dyes, which are said to be useful for dyeing synthetic fibers, have been found to dye polyester fibers in dull reddish, violet shades of poor lightfastness and poor resistance to sublimation.

I have discovered that superior dyeings of excellent shade and fastness properties can be made on polyester textile materials using a novel class of 1,2-dihydroxy-4-thiophenoxy anthraquinones. These new dyes, when suitably dispersed and applied to aromatic polyester fibers by the carrier method, the thermofix method or the pressure method, yield strong bright pink dyeings, especially on texturized double knits, of very good sublimation and light fastness.

SUMMARY OF THE INVENTION

In accordance with one aspect of the invention, there is provided a novel class of 1,2-dihydroxy-4-thiophenoxyanthraquinones of the formula:

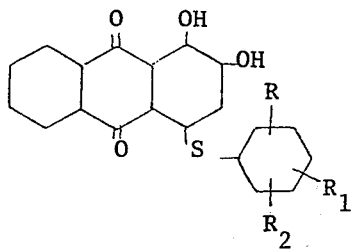

In the above formula, R, $R_1$ and $R_2$ are members independently selected from the group consisting of hydrogen, lower alkyl, hydroxy lower alkyl, chlorine and bromine.

In accordance with a second aspect of the invention there are provided polyester textile materials colored in strong, bright bluish pink hues of excellent buildup, which are obtained by the dyeing of a polyester textile material with the 1,2-dihydroxy-4-thiophenoxyanthraquinone dyes of the invention.

DETAILED DESCRIPTION OF THE INVENTION

The new anthraquinone dyes of the invention are made by condensing bromaminic acid, 1-amino-4-bromoanthraquinone-2-sulfonic acid, with an arylthiol. Bromaminic acid is conveniently made by the method of Dominic A. Zanella described in U.S Pat. No. 3,428,659. Arylthiols particularly useful for preparing the compounds of the invention include thiophenol, p-chlorothiophenol, o-, m-, and p-thiocresols, 4-bromo-m-thiocresol, 4-bromothiophenol, 2,4,5-trichlorothiophenol, 2,4,6-tribromothiophenol and p-bromothiophenol.

The reaction with the arylthiol is conducted in a lower alkanol, such as methanol, ethanol, propanol, or n-butanol, methanol being the preferred solvent. The reaction is advantageously conducted at a temperature of about 60° to 100°C., preferably at the reflux temperature of the reaction mixture.

The intermediate 1-amino-4-thiophenoxyanthraquinone-2-sulfonic acid is hydrolyzed in situ in the presence of an alkali metal hydroxide, preferably potassium hydroxide. After the intermediate is formed, the reaction mixture is cooled and the alkali metal hydroxide is added. The mixture is then heated to a temperature of 100°–120°C. to effect hydrolysis.

The time required for the hydrolysis reaction generally requires between 2 to 4 hours depending upon the choice of reactants and the reaction temperature.

After hydrolysis is complete, the reaction mass is recovered by conventional means, for example, by pouring over ice and acidifying, stirring, filtering and washing the cake acid free.

To prepare the product for application to the polyester substrates, it must be suitably dispersed. This may be done by any of several well-known methods: milling as in a ball-mill with dispersing agents such as lignin sulfonic acid materials for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products as sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C. (104–212°F.) to give a colored fiber containing about 0.01–2 percent by weight dye (100% color basis).

Alternatively, dyeing may be accomplished without a carrier at temperatures of 100°–150°C. under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C. (356°–428°F.) are used for 30 to 90 seconds. If the fabric contains cotton or viscose rayon, apart from synthetic fibers there is little danger of damaging cellulosic portions, but if wool is present, the temperature must be kept within 180°–200°C. and the time must be reduced to 30 seconds.

In addition to the dyeing of polyester textile material the 1,2-dihydroxyanthraquinone configuration of the new dyes is of particular interest because it functions as a metal chelating structure. Thus, in addition to coloring polyesters, the new dyes are valuable for the coloring of metal modified synthetic fibers, such as nickel modified polypropylene fibers and fabrics.

My invention is further illustrated by the following examples.

EXAMPLE I

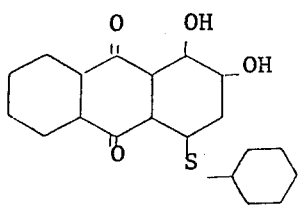

Charged into a 1 liter, 4-neck flask, equipped with a reflux condenser, thermometer and stirrer: 200 g. methanol, 43 g. 89% bromaminic acid, 14 g. potassium hydroxide powder, and 15 g. thiophenol. The mixture was refluxed overnight. The progress of the reaction was observed by Thin Layer Chromatography (TLC). There was no change in TLC after 4 to 5 hours. The mixture was refluxed overnight. Next morning the mixture was cooled in an ice bath and there was added 200 g. potassium hydroxide powder. The mixture was heated at 110°–115°C. for 1½ hours. There was a change in color from dark bluish red to reddish brown. The mass was cooled to 80°C. and diluted with 500 ml. water. The mass was drowned into 1000 ml. water. In order to reduce acidity there was added 500 g. sodium bicarbonate. The mixture was filtered and the cake was covered twice with cold water, then reslurried into 1000 ml. water and made slightly acid with dilute HCl. The mass was filtered and the cake was washed neutral with cold water. The filtration was fast and the washing was colorless. The cake was sucked dry. Yield: 76.9 g. cake. 42% dry test. 32.3 g. 100% material. Theory 34.8 g. Residual Bromine 0.0%.

To prepare a 10% disperse paste there was charged to a sand grinder: 71.4 g. wet cake at 42% dry test = 30 g. 100%, 45 g. Lignosol FTA, and 183.6 ml. water. The mass was sandground until the standard dispersion filter test was satisfactory. Yield: 300 g. of 10% paste.

EXAMPLE II

An aqueous dye bath containing 10 percent Marcron (a commercially available phenolic dye carrier) and 1 percent monosodium phosphate as a buffering agent was prepared. Type 54, Style 755, Dacron polyester fabric was treated in a bath at 120°F. for 10 minutes, the fabric to water dye bath ratio being 1:40. The disperse paste of Example I was added in an amount sufficient to provide a bath containing 0.4 percent dye base based on the weight of polyester fiber. Dyeing was continued for 1 hour at 205°F. and the fabric was removed from the bath, rinsed and dried.

Sample dyeings were tested for sublimation according to standard AATCC Color Fastness to Dry Heat (sublimation) Test No. 117-1967T. Page B-74 of the 1967 Technical Manual of the American Association of Textile Chemists and Colorists. The dyed fabric was placed between a sandwich of undyed Dacron polyester fabric and heat was applied for 30 seconds. Sublimation tests were made at 350° and 400°F. on goods as described above. A sublimation rating of (−4) was established, indicating very good resistance to sublimation. The dyeing was characterized by a bright bluish pink hue with excellent retention of shade when viewed in various types of light.

Similar excellent results were obtained when the dye was applied to the fabric by the Thermosol process and then tested for sublimation as described above.

The dyeings were also tested for light fastness by subjecting them to carbon arc fading in accordance with AATCC Color Fastness to Light Carbon Arc Lamp, Continuous Light Test No. 16A-1971. The dyeings showed only a very slight break at 20 hours' exposure indicating good fastness to light.

EXAMPLE III

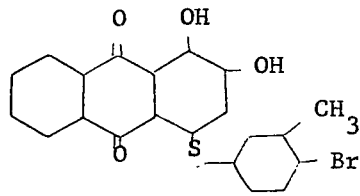

The procedure of Example I was repeated with the exception that in place of 15 g. thiophenol, 30 g. of 4-bromo-m-thiocresol was used. There was obtained 1,2-dihydroxy-4-(4'-bromo-3'-methyl)thiophenoxyanthraquinone in 84% yield. The dispersed product dyes polyester fibers in attractive bluish red shades having similar properties to the dyeings obtained in Example II.

EXAMPLE IV

Piece goods of "HERCULON TYPE 40" an isotactic polypropylene containing a bis (p-alkylphenol) monosulfide nickel compound in the amount of about 0.12% calculated as metallic nickel by weight based on the weight of the polypropylene, were placed in a bath set at 35 C. containing 1% Triton X-100 (iso-octylphenyl-polyethoxyethanol) based on weight of fiber, 1.0–1.5% acetic acid (pH 3–4) and a 1.0% (on weight of fiber) dispersion of the dye from Example I. After 5 minutes, the temperature was raised to 95°C over a 30 minute period. The dyeing was continued at 95° for an additional 45 minutes.

The piece goods were removed from the dye bath, rinsed and soaped in 0.5% soap solution at 90°C. for 10 minutes. The dyed fabrics were rinsed with water and dried. They were colored a deep bluish red shade having good light fastness and excellent fastness to crocking and dry cleaning.

EXAMPLE V

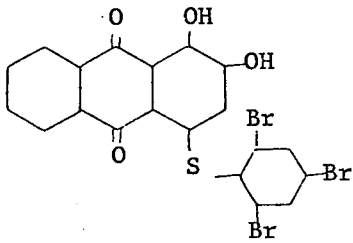

Charged to a 1 liter, 4-neck flask, equipped with a reflux condenser, thermometer and stirrer: 400 g. glacial acetic acid, 35 g. of the product obtained in Example I and 0.3 g. iodine. Then there was added dropwise at room temperature during 2 hours a solution of 50 g. bromine in 100 ml. glacial acetic acid. Temperature was raised to 80°C. during 2 hours and was held at 80°–85°C for 5 hours. The reaction mass was stirred to room temperature. It was then drowned into 1500 ml. water and stirred for a few minutes. The mixture was filtered and the cake was washed neutral with water. The product was dried in an oven at 80°C. The dispersed material dyed polyester fibers in bright red shades of excellent general fastness properties especially to sublimation.

EXAMPLE VI

A printing paste was prepared with 1000 parts of Tragacanth gum thickener (polysaccharides of galactose, fructose, xylose and arabinose with glucuronic acid), 5 parts acetic acid and a quantity of dispersed dye corresponding to 5 to 10 parts of the pure dye obtained in Example V. A fabric made of fibers of polypropylene containing nickel was printed on a roller. The fabric was dried and steamed for 8 minutes at 105°–110°C. The fabric was vigorously washed in a bath of soap at 90°C. A bright red shade was obtained which possessed excellent fastness to the chlorinated solvents used in dry cleaning and very good fastness to light and crocking.

EXAMPLE VII

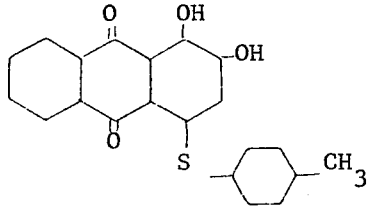

In a substantially identical manner to that described in Example I, an equivalent quantity of p-thiocresol was used instead of thiophenol. There was obtained 30 g. of 1,2-dihydroxy-4-(4'-methyl)-thiophenoxy-anthraquinone. When this dye was dispersed and applied to polyester as in Example II, the fibers were dyed deep bluish pink which likewise have very good general fastness properties.

EXAMPLE VIII

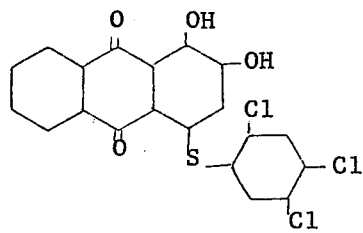

If, instead of the thiophenol in Example I, an equivalent amount of 2,4,5-trichlorothiophenol is used, the above product is obtained in 80% yield. The dispersed product of this example, when applied to metal containing polypropylene in accordance with the procedures described in Example IV or Example VI provides excellent penetration and dyes the polypropylene in red shades having good light fastness and excellent fastness to crocking and dry cleaning.

EXAMPLE IX

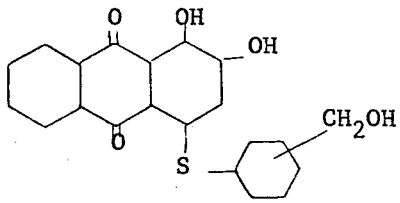

Charged to a 1 liter, 4-neck flask equipped with thermometer, stirrer and anhydrous calcium chloride tube: 600 g. sulfuric acid 98%. There was added in small portions below 10°C., 35 g. of the product obtained in Example I. The mixture was stirred to complete solution for 1 hour. Then there was added dropwise below 10°C., 136 ml. water. While the temperature was still below 10°C. there was added over 10 minutes 20 g. 93% paraformaldehyde. The reaction mass was stirred to room temperature overnight. It was then drowned into 3,000 ml. ice water. After stirring a few minutes, the mixture was filtered and the cake was washed neutral with water. The dispersed product dyed polyester fibers in bright pink shades of excellent general fastness properties and outstanding fastness to sublimation.

I claim:
1. A dye of the formula:

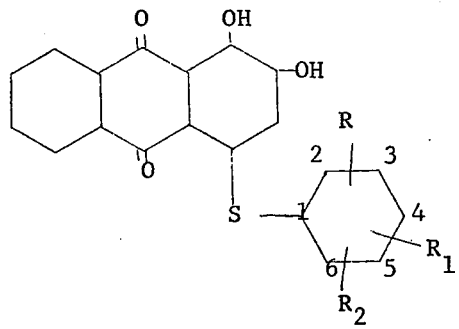

in which R, $R_1$ and $R_2$ are members independently selected from the group consisting of hydrogen, lower alkyl, hydroxy lower alkyl, chlorine and bromine.

2. A dye of claim 1 wherein R is 3-methyl, $R_1$ is 4-bromo and $R_2$ is hydrogen.

3. A dye of claim 1 wherein R, $R_1$ and $R_2$ are 2,4,6-tribromo.

4. A dye of claim 1 wherein R is 4-methyl and $R_1$ and $R_2$ are hydrogen.

5. A dye of claim 1 where R is hydroxymethyl and $R_1$ and $R_2$ are hydrogen.

\* \* \* \* \*